J. M. WARD.
NUT LOCK.
APPLICATION FILED OCT. 5, 1914.

1,162,531.

Patented Nov. 30, 1915.

Inventor
J. M. Ward.

Witnesses

By
Attorney

UNITED STATES PATENT OFFICE.

JARRETT M. WARD, OF JARRETTSVILLE, MARYLAND.

NUT-LOCK.

1,162,531.  Specification of Letters Patent.  Patented Nov. 30, 1915.

Application filed October 5, 1914. Serial No. 865,132.

*To all whom it may concern:*

Be it known that I, JARRETT M. WARD, a citizen of the United States, residing at Jarrettsville, in the county of Harford and State of Maryland, have invented certain new and useful Improvements in Nut-Locks; and I do hereby declare the following to be a full, clear, and exact description of the invention, such as will enable others skilled in the art to which it appertains to make and use the same.

This invention relates to nut and bolt locks and one of the principal objects of the invention is to provide a nut lock in which a nut may be secured at any desired point on the threaded portion of the bolt and may be locked against movement in either direction, and which will permit the nut to be readily removed or adjusted upon the threaded portion of the bolt.

Another object of the invention is to provide a nut lock in which the nut is locked upon the bolt at any desired point by a key and in order to prevent the key from displacement the bolt is made expansible and a plug is fitted to an interior screw threaded portion.

Figure 1:
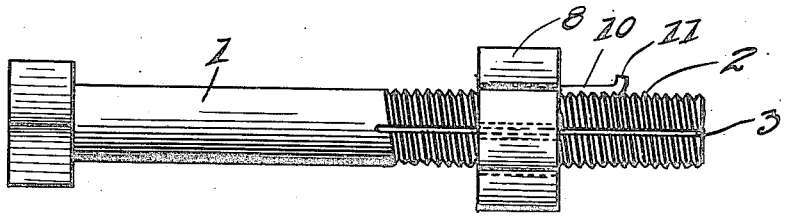
Figure 2:
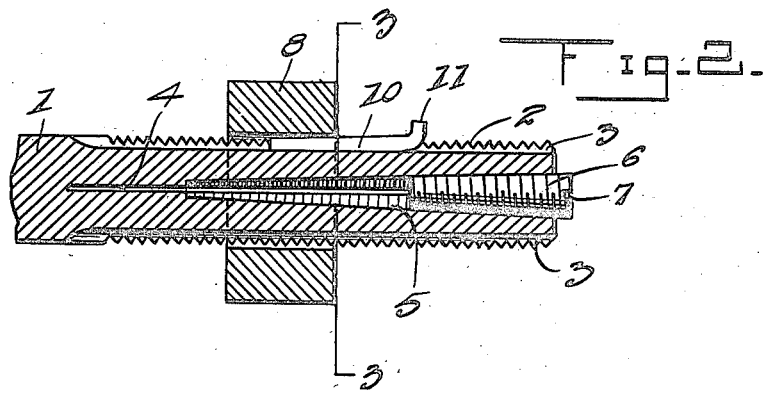
Figure 3:
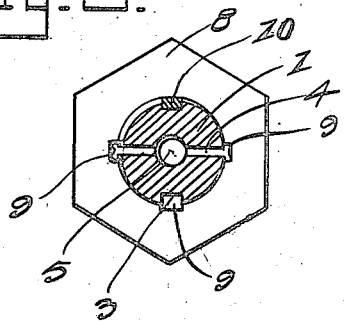
Figure 4:
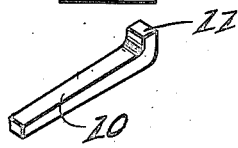

The foregoing and other objects may be attained by means of the construction illustrated in the accompanying drawings, in which, Figure 1 is a side elevation of a bolt and nut lock made in accordance with this invention, the threaded plugs being removed, Fig. 2 is a central longitudinal section through the bolt and nut and showing the threaded plug in place in elevation, Fig. 3 is a sectional view taken on the line 3—3 of Fig. 2, and Fig. 4 is a perspective view of the locking key.

Referring to the drawings the numeral 1 designates a bolt which may be of any suitable size, and provided with a threaded end 2. The threaded end is provided with a plurality of longitudinal grooves 3 which may extend the full length of the threaded portion. As shown there are four grooves in the bolt, but it will be understood that any number may be utilized. The threaded end of the bolt is partially separated into two sections by a slot 4, and a tapering bore 5 is provided longitudinally of the bolt, said tapering bore being threaded oppositely to the threads 2 of the bolt. That is to say, if the threads 2 are right hand threads the threads in the bore 5 will be left hand threads and vice versa. Fitted in the bore 5 is a threaded expansive plug 6, said plug having a screw driver groove 7 in the outer end thereof and said plug being tapered to fit the bore 5. The nut 8 is provided with longitudinal grooves 9 in the opposite sides thereof, there being four such grooves, and to hold the nut firmly on the threaded portion 2 of the bolt at any desired point a key 10 is provided. The key 10 is slightly tapered in form and is provided with a suitable bent end or head 11.

The operation of the invention may be briefly described as follows: When the nut 8 is turned on the threaded portion of the bolt 1 to the desired position, the key 10 is inserted in one of the grooves 3 of the bolt and the registering groove 9 of the nut. In this condition the key 10 might readily work loose but when the threaded plug 6 is turned into the bore 5 on the bolt at the end the key is held firmly in place and cannot become detached or lost, and as a result the nut is held firmly in place without possibility of accidental displacement.

From the foregoing it will be obvious that a nut lock made in accordance with this invention provides an expansible bolt and also a nut lock of reliable construction.

Various changes may be made in the details of construction without departing from the spirit and scope of the invention as defined in the claim.

What is claimed is:—

A nut lock comprising a bolt provided with a head and shank, the upper portion of the shank being threaded, the shank having a longitudinal slit extending the entire threaded portion and longitudinal grooves at right angles to the slit, said shank having an axially extending tapering threaded bore, a nut threaded on said bolt having a plurality of grooves extending through the nut for registering with the grooves on the bolt, a key fitted in said registering grooves to keep the said nut from rotating and tapering threaded plug to expand said bolt thereby keeping the key in engagement with the walls of said registering grooves.

In testimony whereof I affix my signature in presence of two witnesses.

JARRETT M. WARD.

Witnesses:
T. H. WARD,
J. E. WARD.